Figure 1:
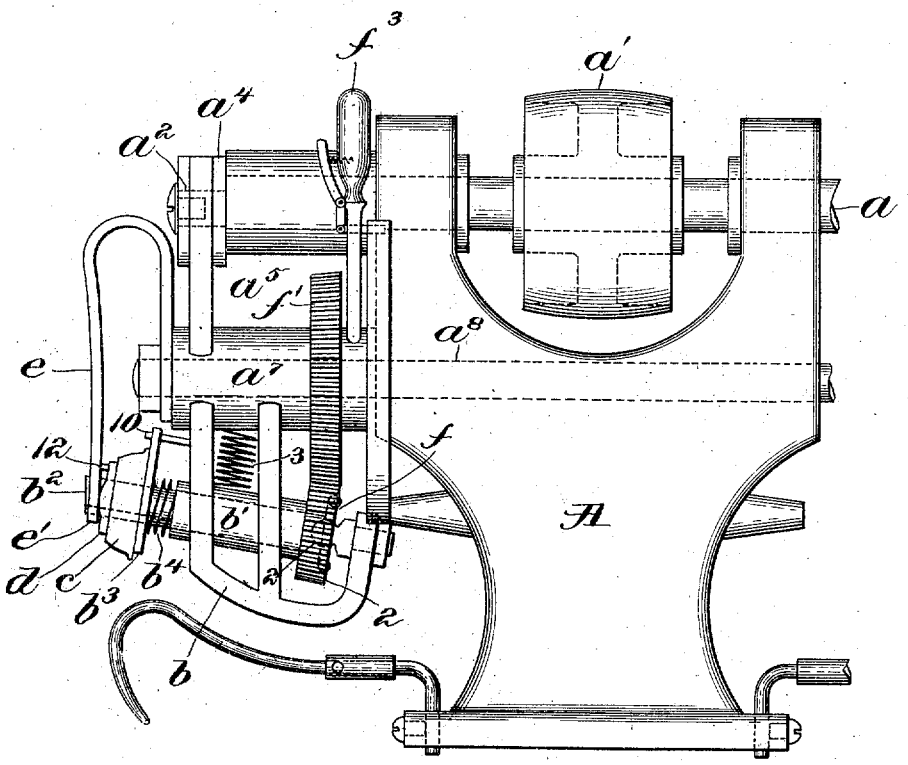

2 Sheets—Sheet 1.

S. D. TRIPP.

EDGE FINISHING MACHINE.

No. 11,580. Reissued Dec. 29, 1896.

Witnesses:
Arthur L. Randall
L. M. Garbutt

Inventor:
Seth D. Tripp
by B. J. Hayes
Atty

S. D. TRIPP.

EDGE FINISHING MACHINE.

No. 11,580. Reissued Dec. 29, 1896.

Witnesses:
Arthur H. Randall
L. M. Gaskill

Inventor:
Seth D. Tripp
by B. J. Hayes
Atty

UNITED STATES PATENT OFFICE.

SETH D. TRIPP, OF LYNN, MASSACHUSETTS.

EDGE-FINISHING MACHINE.

SPECIFICATION forming part of Reissued Letters Patent No. 11,580, dated December 29, 1896.

Original No. 566,819, dated September 1, 1896. Application for reissue filed October 21, 1896. Serial No. 609,625.

*To all whom it may concern:*

Be it known that I, SETH D. TRIPP, of Lynn, county of Essex, and State of Massachusetts, have invented an Improvement in Edge-Finishing Machines, of which the following description, in connection with the accompanying drawings, is a specification, like letters and figures on the drawings representing like parts.

This invention relates to edge-finishing machines adapted for finishing the edges of the soles of boots and shoes. In machines of this class the edge-finishing tools have been moved back and forth, as, for instance, they have been oscillated or reciprocated. For the production of good work it is necessary to oscillate or reciprocate the edge-finishing tool very rapidly, and when the tool is so driven it will vibrate or jar the shoe and consequently the hands and arms of the operator holding it, such action being due, mainly, on account of the irregular form or curvature of the shoe-sole.

This invention has for its object to very materially reduce this vibration or jar incident to rapidly operating the tool in the manner above referred to; and the invention consists in giving to an oscillating edge-finishing tool or one moving rapidly back and forth an independent back and forth movement, so that it will advance or move along the work in each direction as it oscillates.

In carrying out this invention I provide a frame and means for moving it rapidly back and forth, and upon said frame I mount the edge-finishing tool and provide means for moving said tool back and forth in unison with the frame. The tool will preferably be moved back and forth in the arc of a circle, while the frame carrying it may be vibrated or moved back and forth in any desirable manner, so long as the parts operate in unison. The tool may not only be oscillated in unison with the back-and-forth movement of the frame carrying it, but also moved in a like direction. As herein shown, the edge-finishing tool is mounted upon an oscillating shaft which is carried by an oscillating frame, so that the tool has imparted to it an oscillating motion on its own axis in addition to a vibrating or oscillating movement on the axis of the frame carrying it. The edge-finishing tool is provided with a plurality of working faces, and means are provided for adjusting said tool while in operation to bring any one of its working faces into working position. A friction heating device is provided for the edge-finishing tool which comprises friction-plates bearing directly against the opposite sides of the tool, means being provided for holding said plates in such frictional engagement. The shaft carrying the edge-finishing tool is adapted to be raised or to yield in a vertical direction, and the tool is also adapted to yield in a longitudinal direction on the shaft which carries it.

Figure 3:
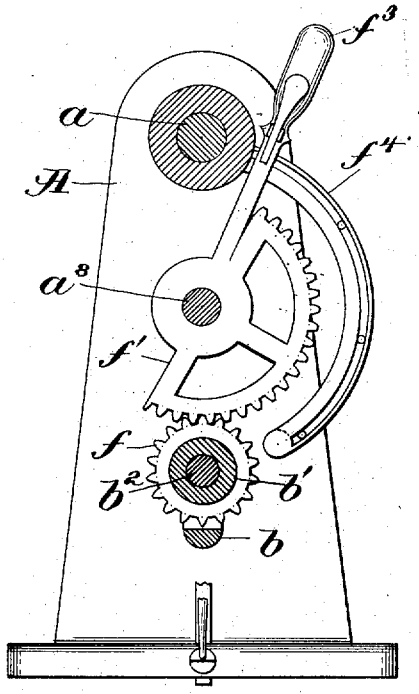
Figure 2:
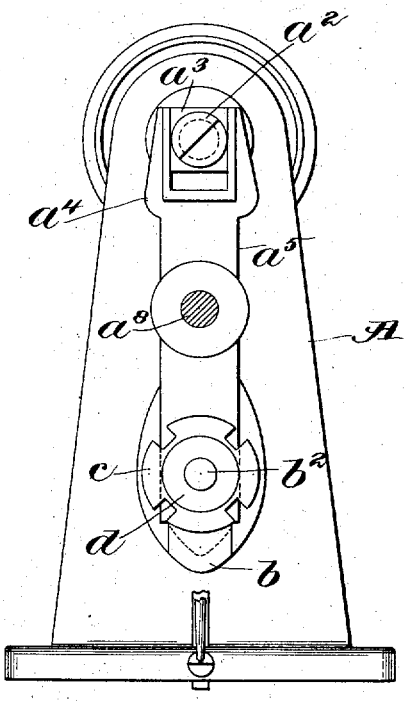
Figure 4:
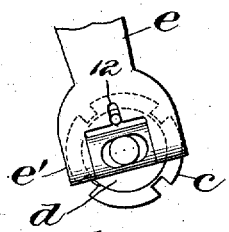

Figure 1 shows in side elevation an edge-finishing machine embodying this invention; Fig. 2, a right-hand end elevation of the same, the friction heating device being removed; Fig. 3, a vertical section of the machine, taken on the dotted line $x\ x$, Fig. 1; Fig. 4, a detail to be referred to.

The main frame A is of suitable construction to support the operating parts. The main shaft $a$ has its bearings in said frame, and has a driving-pulley $a'$ mounted upon it. Formed upon the end of the shaft $a$ is a crank-pin or eccentric $a^2$, which receives upon it a box $a^3$. The crank-pin is free to rotate in the box, but as it turns said box is moved to correspond with the travel of the crank-pin. The box $a^3$ is fitted to work within the bifurcated upper end $a^4$ of a pivoted arm $a^5$, as, for instance, it may project from a sleeve $a^7$, placed upon a stud or rod $a^8$, which serves as a pivot on which said arm vibrates. The sleeve $a^7$ has depending from it a frame $b$, which serves as a bearing or support for the bearing-box $b'$, which is bored to receive a shaft $b^2$. The bearing-box $b'$ and shaft $b^2$ are arranged obliquely, and the rear end of said shaft $b^2$ has formed in it a socket which receives a spherical stud 2, secured to a rearwardly-projecting portion of the frame $b$. A spring 3 is interposed between the bearing-box $b'$ and the sleeve $a^7$, the tendency of which is to depress said bearing-box and parts borne by it, yet permitting said box to yield in an upward direction when it is desired to raise the edge-finishing tool $c$, which is placed upon the shaft. The edge-finishing tool $c$ is made as a hub adapted to be placed upon the forward end of said shaft $o^2$, bearing against a washer $b^3$, also placed on said shaft, which latter in turn bears against a spring $b^4$, likewise placed upon the shaft and next to the front end of the bearing-box $b'$, so that said spring is interposed between the bearing-box $b'$ and the washer and acts to permit the edge-finishing tool to yield longitudinally on the shaft. The edge-finishing tool is splined onto the shaft $b^2$ and is thereby permitted to move longitudinally thereon. A washer $d$ is placed on the shaft $b^2$ next to and bearing against said edge-finishing tool, and a strong flat spring $e$ is attached to the rod $a^8$, which is bent more or less U-shaped and provided with a bifurcated end $e'$, which embraces the shaft $b^2$ and bears upon the washer $d$. The washers $b^3$ and $d$ are held from turning with the shaft, and for simplicity there may be a pin 10 on the depending arm, which projects from and enters a slot formed in the washer $b^3$, and a pin 12 on the washer $d$, which projects forward and enters a slot in the flat spring. The spring $e$, bearing against the washer $d$ at one side of the edge-finishing tool, and the washer $b^3$, bearing against the edge-finishing tool at the opposite side, serve as a friction heating device. As the main shaft $a$ revolves the arm $a^5$ is vibrated, oscillating the sleeve $a^7$ on the rod $a^8$ and correspondingly oscillating the depending frame $b$, and consequently the edge-finishing tool. The edge-finishing tool thus moves back and forth in the arc of a circle about the rod $a^8$ as a center.

The edge-finishing tool has a plurality of working faces, it being herein represented as having four, each differently formed, yet it is obvious that it may have as many as desired. In practice it is frequently necessary to adjust said edge-finishing tool while it is operating to bring a different working face into working position, and to accomplish this result a toothed gear $f$ is secured to the tool-carrying shaft $b^2$, which is engaged by a toothed sector $f'$, mounted on rod $a^8$ and provided with a hand-lever $f^3$, by means of which it may be turned on its pivot. A quadrant $f^4$ is fixed to the main frame, having as many notches as there are working faces on the edge-finishing tool, and the hand-lever has a locking-detent adapted to enter any one of the notches and thereby hold the pivoted sector in different positions. It will be seen that by disengaging the locking-detent and turning the pivoted sector the toothed gear will be rotated to turn the tool-carrying shaft, and consequently the tool which is splined thereon. This adjustment may be made while the edge-finishing tool is in operation, notwithstanding it may be operating very rapidly. The toothed gear and toothed sector also enable another most important function to be performed, namely, to oscillate the tool-carrying shaft on its axis, and consequently impart to the edge-finishing tool an oscillatory motion, for it will be seen that as the toothed sector is held at rest whenever the frame $b$, carrying the tool-carrying shaft, oscillates in one direction the toothed gear will be rotated one way, and as the frame oscillates in the opposite direction the toothed gear will be rotated in the opposite way. Thus it will be seen that the edge-finishing tool has an oscillating movement on its own axis in addition to the vibratory or oscillatory movement of the frame carrying it, and as a consequence the edge-finishing tool will act or work upon the sole edge as it is bodily moved in each direction along said sole edge, thus having a compound vibratory movement. It will also be seen that, as herein shown, the back-and-forth movements or oscillations of the tool are in unison with the back-and-forth movements of the frame carrying it and also in a like direction. The pivoted sector instead of being utilized as a coöperative part of the group of mechanism adapted to perform the double function above set forth may be secured permanently to the frame and the hand-lever and locking devices omitted, in which case the edge-finishing tool will be oscillated as the frame oscillates; but it cannot be adjusted to present different working faces into working position. With a machine constructed in this latter way the edge-finishing tool, if provided with a plurality of working faces, may be adjusted in any well-known way.

I desire it to be understood that I do not wish to limit my invention to the particular means herein shown for imparting independent oscillatory motion to the oscillating tool, and, furthermore, believing myself to be the first to provide an edge-finishing machine with a tool-carrying frame and means for moving it back and forth or oscillating it and providing means for moving the tool carried by said frame back and forth or oscillating it independently of but in unison with the back-and-forth movements of the frame I desire it to be understood that such features come within the spirit and scope of this invention.

I claim—

1. In an edge-finishing machine, a frame, means for moving it back and forth, an edge-finishing tool carried by said frame, and means for moving it back and forth in unison with said frame, substantially as described.

2. In an edge-finishing machine, a frame, means for moving it back and forth, an edge-finishing tool carried by said frame, and means for moving said tool back and forth in the arc of a circle in unison with said frame, substantially as described.

3. In an edge-finishing machine, a frame, means for moving it back and forth, an edge-finishing tool, carried by said frame, and means for moving it back and forth in unison with said frame, and in a like direction, substantially as described.

4. In an edge-finishing machine, a frame, means for moving it back and forth in the arc of a circle, an edge-finishing tool carried by said frame, and means for moving said tool back and forth in the arc of a circle in unison with said frame, substantially as described.

5. In an edge-finishing machine, the combination of an oscillating frame, an oscillating shaft carried by it, and means for oscillating said shaft in unison with the oscillatory movement of the frame, and an edge-finishing tool mounted on said shaft, substantially as described.

6. In an edge-finishing machine, the combination of an oscillating frame, an oscillating shaft carried by it and pivotally connected to it to be moved independently of the frame, and means for oscillating said shaft during the oscillatory movement of the frame, and an edge-finishing tool mounted on said shaft, substantially as described.

7. In an edge-finishing machine, the combination of an oscillating frame, oscillating shaft carried by it, an edge-finishing tool secured to said oscillating shaft, friction heating-plates on said oscillating shaft bearing directly against said tool, and means for holding said plates in frictional engagement with said tool, substantially as described.

8. In an edge-finishing machine, the combination of a frame, means for moving it rapidly back and forth, an oscillating shaft carried by said frame, and means for oscillating said shaft during the back and forth movements of the frame, an edge-finishing tool mounted on said shaft having a plurality of working faces, and means for turning said shaft to adjust the tool while it is oscillating, substantially as described.

9. In an edge-finishing machine, an edge-finishing tool having a plurality of working faces, a shaft supporting it, an oscillating frame supporting said shaft, and means for turning said shaft to adjust the tool, consisting of a toothed gear on the shaft, a toothed sector, and means for turning said sector, substantially as described.

10. In an edge-finishing machine, an edge-finishing tool having a plurality of working faces, a shaft supporting it, an oscillating frame supporting said shaft, and means for turning said shaft to adjust the tool, consisting of a toothed gear on the shaft, a toothed sector, and means for turning said sector, and a locking device for said sector, substantially as described.

11. In an edge-finishing machine, the combination of an oscillating frame, an oscillating shaft carried by it, and supported obliquely, as shown, and means for oscillating said shaft during the oscillatory movement of the frame, and an edge-finishing tool mounted on said shaft, substantially as described.

12. In an edge-finishing machine, the combination of an oscillating frame, an oscillating shaft supported obliquely by it, means for oscillating said shaft during the oscillatory movement of said frame, and an edge-finishing tool having a plurality of working faces splined on said oblique shaft, and moving longitudinally thereon, substantially as described.

13. In an edge-finishing machine, the combination of an oscillating frame, a shaft borne by it carrying an edge-finishing tool, a toothed gear on said shaft, and a toothed sector which it engages, whereby the shaft is oscillated on its axis during the oscillations of the frame, substantially as described.

14. In an edge-finishing machine, the combination of an oscillating frame, a shaft supported by it carrying an edge-finishing tool, a toothed gear on said shaft, and toothed sector engaging it, and a hand-lever for turning said sector to turn the shaft and adjust the tool carried by it, and a locking device for said sector, substantially as described.

In testimony whereof I have signed my name to this specification in the presence of two subscribing witnesses.

SETH D. TRIPP.

Witnesses:
B. J. NOYES,
L. M. GARBUTT.